United States Patent
Gijsman et al.

(10) Patent No.: US 8,404,148 B2
(45) Date of Patent: Mar. 26, 2013

(54) COMPOSITION WITH A POLYMER AND AN OXIDATION-CATALYST

(75) Inventors: Pieter Gijsman, Beek (NL); Johan Franz Gradus Antonius Jansen, Galeen (NL); Dirk Armand Wim Stanssens, Houthalen (BE)

(73) Assignee: DSM IP Assets B.V., Heerlen (NL)

( * ) Notice: Subject to any disclaimer, the term of this patent is extended or adjusted under 35 U.S.C. 154(b) by 454 days.

(21) Appl. No.: 12/373,113

(22) PCT Filed: Jul. 4, 2007

(86) PCT No.: PCT/EP2007/005905
§ 371 (c)(1),
(2), (4) Date: Nov. 16, 2009

(87) PCT Pub. No.: WO2008/006491
PCT Pub. Date: Jan. 17, 2008

(65) Prior Publication Data
US 2010/0051860 A1   Mar. 4, 2010

(30) Foreign Application Priority Data

Jul. 11, 2006 (EP) ..................................... 06014331
Jul. 11, 2006 (EP) ..................................... 06017792

(51) Int. Cl.
*C07C 27/22* (2006.01)
(52) U.S. Cl. ................................................. 252/188.28
(58) Field of Classification Search ............... 252/188.28
See application file for complete search history.

(56) References Cited

U.S. PATENT DOCUMENTS

| 2,960,510 | A |   | 11/1960 | Slager |
|---|---|---|---|---|
| 4,517,318 | A |   | 5/1985 | Miyoshi et al. |
| 4,845,137 | A |   | 7/1989 | Williams et al. |
| 4,886,618 | A | * | 12/1989 | Novak et al. ............. 252/188.28 |
| 5,648,020 | A |   | 7/1997 | Speer et al. |
| 2001/0027225 | A1 |   | 10/2001 | Downie |
| 2002/0151616 | A1 | * | 10/2002 | Ozai et al. ........................ 522/99 |
| 2006/0202161 | A1 | * | 9/2006 | Share et al. .............. 252/188.28 |

OTHER PUBLICATIONS

International Search Report for PCT/EP2007/005905, mailed Sep. 26, 2007.

* cited by examiner

*Primary Examiner* — Harold Pyon
*Assistant Examiner* — Katie L Hammer
(74) *Attorney, Agent, or Firm* — Nixon & Vanderhye P.C.

(57) ABSTRACT

The present invention relates to a polymer composition with an increased rate of oxygen-uptake by the presence of an oxidation catalyst. The invention further relates to a process to increase the rate of oxygen-uptake by a polymer composition. The invention also relates to a process to increase the oxo-biodegradability of a polymer composition and to the use of such a composition for the preparation of a product having a controlled lifetime. The invention further relates to a process to increase the rate of oxygen-scavenging in a composition containing a carbon-containing polymer, the composition obtained by this method and its use in the preparation of an oxygen-scavenging product. The present invention further relates to objects containing an oxygen scavenging layer containing such a composition.

8 Claims, No Drawings

COMPOSITION WITH A POLYMER AND AN OXIDATION-CATALYST

This application is the U.S. national phase of International Application No. PCT/EP2007/005905, filed 4 Jul. 2007, which designated the U.S. and claims priority to European Application No(s). 06017792.0, filed 11 Jul. 2006 and 06014331.0 filed 11 Jul. 2006, the entire contents of each of which are hereby incorporated by reference.

The present invention relates to a polymer composition with an increased rate of oxygen-uptake by the presence of an oxidation catalyst. The invention further relates to a process to increase the rate of oxygen-uptake by a polymer composition. The invention also relates to a process to increase the oxo-biodegradability of a polymer composition and to the use of such a composition for the preparation of a product having a controlled lifetime. The invention further relates to a process to increase the rate of oxygen-scavenging in a composition containing a carbon-containing polymer, the composition obtained by this method and its use in the preparation of an oxygen-scavenging product. The present invention further relates to objects containing an oxygen scavenging layer containing such a composition.

The oxidation catalyst incorporated in the composition according to the present invention accelerates the oxygen-uptake by the carbon-containing polymer.

It is known from for example "Oxidation Inhibition in Organic Materials, Vol. I, eds. Jan Pospisil and Peter Klemchuk, CRC Press Inc., Boca Raton, USA, 1990, pg 226, to add transition metal compounds and more specifically cobalt-containing compounds, to carbon-containing polymers to accelerate the rate of oxygen uptake into the polymers.

The use of transition metal compounds for this purpose is widespread; in practice almost only cobalt compounds are used. However in recent years the discussion was started to minimize or even ban the use of cobalt compounds. The reason for this is the concern regarding the toxicity of cobalt and other transition metals on the environment. For example cobalt is known to have acute and chronic toxicity for aquatic life. Therefore the use of cobalt is under discussion and good alternatives are necessary to replace cobalt in the above-indicated field of use. There is, thus, a need for alternative oxidation catalysts with less disadvantageous environmental effects. Aim of the invention is to provide a composition with an increased rate of oxygen-uptake, containing a carbon-containing polymer and an oxidation catalyst wherein the oxidation-catalyst does not contain cobalt. With "increased rate" is here and hereinafter meant a rate that is higher when determined in the presence of an oxidation-catalyst than the rate in the absence of an oxidation-catalyst.

This aim is achieved in that the composition containing the carbon-containing polymer further contains a component containing at least one moiety according to formula I:

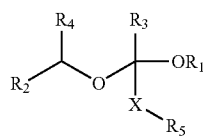

with X being $CHR_6$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_6$: OR, SR, NRR', R, O⁻M⁺; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;
M⁺: an alkaline metal cation or earth alkaline metal cation, or an ammonium ion.
$R_1$-$R_6$ may be joined together to form a cyclic structure of at least 5 carbon atoms.

It has surprisingly been found that the component containing at least one moiety according to formula I is an alternative for a transition metal catalyst.

Preferably the composition containing the carbon-containing polymer contains a component containing at least one moiety according to formula II:

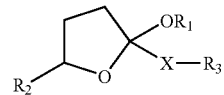

with X being $CHR_4$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_4$: OR, SR, NRR', R, O⁻M⁺; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;
M⁺: an alkaline metal cation or earth alkaline metal cation, or an ammonium ion.
$R_1$-$R_3$ may be joined together to form a cyclic structure of at least 5 carbon atoms and $R_5$.

More preferably composition containing the carbon-containing polymer contains a component containing at least one moiety according to formula III:

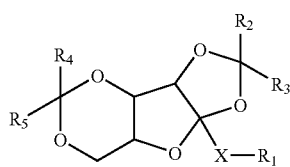

with X being $CHR_6$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_6$: OR, SR, NRR', R, O⁻M⁺; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;

$M^+$: an alkaline metal cation or earth alkaline metal cation, or an ammonium ion.

$R_1$-$R_6$ may be joined together to form a cyclic structure of at least 5 carbon atoms.

Examples of substituents to the alkyl-, aryl-, alkylaryl- or arylalkyl group are groups such as halogens, amine groups, alcohols, ethers, esters, ketones, aldehydes, polyalkyleneoxy residues, carboxylates, anhydrides, amides, ureas or urethanes.

In all three formula's I, II or III the cyclic structure that can be formed by joining together any of $R_1$-$R_6$, preferably contains at least 7 carbon atoms, more preferably at least 9.

Examples of polymeric residues are, for instance, polyethylene, polypropylene, polystyrene, polyethylene oxide, polypropylene oxide, polycarbonate, polyurethane or polyester.

Preferably, from a processability point of view the composition of the present invention contains a component containing at least one moiety according to formula I, II or III with a molecular weight of at least 200 g/mol, more preferably at least 350 g/mol, even more preferably at least 500 g/mol. The molecular weight of the component containing at least one moiety according to formula I, II or III is expressed as the number average molecular weight (Mn) as determined by mass spectrometry. Components with lower molecular weights are less preferred as they are difficult to use in the compounding process.

The amount of component containing at least one moiety according to formula I, II or II in the composition may vary within rather wide ranges and may be chosen depending on the kind of application in which the composition of the invention is applied. The skilled man can easily assess by routine experimentation, in dependence of the type of application selected, which amount thereof leads to good results. Preferably the amount of component containing at least one moiety according to formula I, II or III in the composition is at least 0.001 wt %, preferably at least 0.01 wt % and even more preferably at least 0.05 wt %, calculated on the total weight of the composition. Preferably, the amount of component containing at least one moiety according to formula I, II or III in the composition is lower than 80 wt %. Preferably the amount of the moiety according to formula I, II or III is between 0.1 wt % and 50 wt %, more preferably this amount is between 0.2 wt % and 20 wt %. Here and hereinafter when numerical ranges are described the upper and lower limits are included to be in the range.

As the skilled man will understand from the foregoing, it is also possible to use more than one component containing at least one moiety according to formula I, II or III. Within the scope of the invention is both a combination of components according to the same formula and a combination of components according to different formula's. In a situation where more than one component containing at least one moiety according to formula I, II or III is used, the mentioned amount refers to the total of components containing at least one moiety according to formula I, II and III.

Suitable components containing at least one moiety according to formula I, II or III can either be bought commercially or prepared according to generally known methods.

The carbon-containing polymer that can be used in the composition according to the present invention is not particularly critical and will generally be determined by the envisaged use of the final polymer composition. Examples of suitable, preferred polymers are polymers such as for example saturated polyesters, saturated polyethers, saturated polyethers and saturated hydrocarbon polymers and excluding unsaturated polyesters. Preferred polymers are saturated polyolefins, for example polyethylene, polypropylene and their copolymers. Examples of preferred saturated polyesters are polyethylene terephthalate, polybutylene terephthalate, polybutylene succinate terephthalate, polybutylene adipate terephthalate polylactide (co) polymers, polycaprolactone, polyhydroxyalkanoates (such as for example polyhydroxybutyrate), polyesteramides. Examples of preferred polyethers are polyethyleneglycol, polypropyleneglycol and polyterahydrofuran. Further suitable polymers are styrene (co)polymers and its blends with polyunsaturated polymers; unsaturated polymers such as polydiene rubber, for example cis-polyisoprene (natural or synthetic); polybutadiene; styrene-butadiene; copolymers of unsaturated polymers with saturated polymers, such as acrylonitrile-butadiene-styrene (ABS); and block co-polymers, for example styrene-butadiene-styrene (SBS); and mixtures of any of the foregoing polymers.

It is convenient and operationally preferably to pre-form a concentrate (a so-called "masterbatch") of the component containing at least one moiety according to formula I, II or III in a suitable carbon-containing polymer. This carbon-containing polymer in the masterbatch may be the same as the carbon-containing polymer to which it is to be added. However it is also possible to add the component containing at least one moiety according to formula I, II or III to another type of carbon-containing polymer than the carbon-containing polymer in the final, envisaged composition. The "masterbatch" comprising the component containing at least one moiety according to formula I, II or III and the carbon-containing polymer can be added to the carbon-containing polymer of the final composition by any suitable method known to the man skilled in the art. Examples of suitable techniques are extruding, mixing or dry-blending.

The required concentration of the component containing at least one moiety according to formula I, II or III in the final carbon-containing polymer can be reached by dilution; thus by adding as much masterbatch to the final carbon-containing polymer as necessary to reach the desired concentration of the component containing at least one moiety according to formula I, II or III in the final carbon-containing polymer. The man skilled in the art can easily calculate, when knowing the "loading" of the masterbatch, the amount of masterbatch needed to reach the desired level of component containing at least one moiety according to formula I, II or III in the final composition. With the "loading" of the masterbatch is meant the amount of component containing at least one moiety according to formula I, II or III present in the carbon-containing polymer that is used to prepare the masterbatch with. Normally the loading will be expressed as a percentage by weight. With "final composition" is here and hereinafter meant the composition containing the component containing at least one moiety according to formula I, II or III and the carbon-containing polymer. When a masterbatch is used wherein another type of carbon-containing polymer is used than the carbon-containing polymer that needs to be activated by the oxidation catalyst, than the amount of carbon-containing polymer from the masterbatch is included in the calculation of the final composition.

Next to the "masterbatch method" to prepare the composition containing the component containing at least one moiety according to formula I, II or III, also other methods are possible and generally known to the man skilled in the art. It is also possible to mix the carbon-containing polymer with the component containing at least one moiety according to formula I, II or III in the desired amount from the beginning, this contrary to the masterbatch method where first a composition, a "masterbatch", is prepared with a higher amount of the component containing at least one moiety according to formula I, II or III than finally desired in the polymer composition. The above mentioned mixing step can be performed as a separate step or as a step in the process of manufacturing an article from the polymer composition.

Another method to prepare the polymer composition is by "solvent blending" the component containing at least one moiety according to formula I, II or III with the carbon-containing polymer. Solvent blending is especially suitable for components containing at least one moiety according to formula I, II or III with a relatively low molecular weight.

The mixing, either for the "masterbatch method" or for the "direct method", can be conducted in the equipment generally known in the art, such as for example extruders and mixers. Mixing can occur by melt-mixing, i.e. the mixing takes place above the melting point of the carbon-containing polymer but below its decomposition temperature.

The inventors have further found that the efficiency of the oxidation catalyst is enhanced when the composition according to the invention further contains an alkaline metal salt or earth alkaline metal salt or an ammonium salt as a co-catalyst. Thus the composition than comprises a carbon-containing polymer, a component containing at least one moiety according to formula I, II or III and an alkaline metal salt or earth alkaline metal salt or an ammonium salt as a co-catalyst.

Suitable anions in these salts are for example carboxylate, nitrate, borate, halogenide, sulphite, sulphate or hydroxide. Preferably, the alkaline metal salt or earth alkaline metal salt is a K-, Li- or Na-salt, more preferably a K-, Li- or Na-carboxylate, most preferably a K-carboxylate.

Generally, the carboxylates that can suitably be used in this preferred embodiment of the invention will be carboxylates having from 2 to 50 carbon atoms. Suitable carboxylates that can be used in this preferred embodiment of the present invention are, for instance, propionate, acetate, ethylhexanoate, lactate or butyrate. Another suitable class of carboxylates are the anions from fatty acids, either saturated, mono-unsaturated or poly-unsaturated fatty acids. Suitable examples are stearates, palmitates, linoleates, linolenates and oleates. Preferably carboxylates having at least 4 carbon atoms are used. Preferably the carboxylates have less than 40 carbon atoms. More preferably the carboxylates have between 6 and 32 carbon atoms. Within this range the most advantageous balance between the ease of compounding and the efficiency of the co-catalyst is reached.

Preferably, the amount of the alkaline metal salt or earth alkaline metal salt or ammonium salt, if present, in the composition is at least 0.001 wt %, preferably at least 0.01 wt % and even more preferably at least 0.1 wt %, calculated on the total weight of the composition. Preferably, the amount of alkaline metal salt or earth alkaline metal salt or ammonium salt in the composition is lower than 80 wt %, more preferably lower than 50 wt %. A very advantageous range is between 0.1 and 50 wt %, more preferably between 0.2 wt % and 20 wt %. The co-catalyst can be added in the same manner and with the same methods as described above for the addition of the oxidation catalyst to the polymer.

The present invention also relates to a process to increase the rate of oxygen-uptake in a polymer composition. This process comprises at least the step of adding an oxidation catalyst to the polymer composition. A suitable oxidation catalyst is a component that contains at least one moiety according to formula I, II or III as described above. Preferred embodiments of this component containing at least one moiety according to formula I, II or III moiety are as described above.

In another embodiment it appeared advantageous to add in the process according to the present invention an alkaline metal salt or earth alkaline metal salt or an ammonium salt as co-catalyst. The inventors have found that the efficiency of oxygen-uptake is enhanced when a co-catalyst is added to the polymer composition. The order in which the component containing at least one moiety according to formula I, II or III and the co-catalyst are added to the polymer composition is not particularly relevant. The component containing at least one moiety according to formula I, II or III can be added first or the co-catalyst can be added first or the component containing at least one moiety according to formula I, II or III and the co-catalyst can be added at the same time, either separately or together. Suitable examples of the co-catalyst and details of its use are as described above.

The component containing at least one moiety according to formula I, II or III and/or the co-catalyst can be added to the polymer composition by methods and with apparatus generally known to the man skilled in the art of compounding of polymer compositions.

The present invention also relates to a polymer composition with an increased rate of oxygen uptake which polymer composition can be obtained by the process according to the invention. Such a polymer composition has an increased rate of oxygen uptake compared to polymer compositions in the state of the art, however without the use of environmentally less acceptable metals such as for example cobalt.

The composition according to the invention or obtained by the process according to the invention can be used for the manufacture of all kinds of articles. The present invention also relates to articles made from the composition according to the invention or made from the composition obtainable by the process according to the invention. Especially beneficial is the use of the composition in articles that benefit from an increased rate of oxygen-uptake. Examples of articles that especially benefit are articles that have an oxygen-scavenging function or articles that should deteriorate by the action of atmospheric oxygen. In this last category one could think of articles that are thrown away as "waste" and cause environmental pollution.

The present invention also relates to a process for increasing the oxo-biodegradability of a carbon-containing polymer. Oxo-biodegradation is defined as "biodegradation in which polymer chain cleavage is primary due to oxidation which may be mediated by abiotic chemistry, micro-organisms or a combination of both". However in general the oxidation rate of polymers is too slow to make these polymers biodegradable within an environmentally acceptable time period. It is therefore known to add to polymers substances that promote their degradation so that they disintegrate and subsequently biodegrade in the environment. A number of applications of these systems have become important in recent years in order to reduce the amount of plastic waste being buried in landfill and to return carbon-based polymers to the biological cycle in the form of compost or after degradation by spreading on land. One important application of biodegradable plastics is in short-term applications (e.g. food packaging and landfill covers), where the product lifetime has to be just long enough to provide the appropriate shelf life and service life required by the user of the product. This requirement has in the past been achieved by the addition of transition metal ions to the carbon-containing polymer, which transition metal ions promote oxidation and thus degradation of the polymer. A disadvantage of this process of using transition metal catalysts for accelerating the biodegradability is that it will be unavoidable that part of the transition metal will be causing environmental pollution. It is needless to say that this is not desirable.

Such a prior art process is known from U.S. Pat. No. 5,350,783 wherein it is described that thermoplastic products are degraded into low molecular weight materials with enhanced biodegradability in the presence of a composting promoting agent. The composting promoting agent is chosen from the group of non-metallic metal complexing agents, non-oxidizing metal metal complexing agents. The composting promoting agent converts in the presence of an oxidizing metal compound into an active oxidant. Some examples mentioned of the composting promoting agent are beta-diketones and beta-keto-esters. The composting promoting agent needs always to be combined with an oxidizing metal compound. Some examples of the oxidizing metal compound given are iron, copper, manganese, cobalt, cerium, silver, chromium and nickel.

The aim of the present invention is to overcome the above-mentioned disadvantages and to provide a process for increasing the oxo-biodegradability of a carbon-containing polymer without the need to use environmentally suspect metals and still to reach desirable and acceptable rates of oxo-biodegradation.

This aim is reached by providing a process for increasing the oxo-biodegradability of a carbon-containing polymer, which process at least comprises the step of adding an oxidation catalyst to the carbon-containing polymer. A suitable oxidation catalyst is a component containing at least one moiety according to formula I:

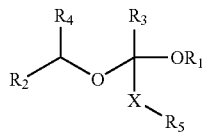

with X being $CHR_6$, or a carbonyl group (C=O)

$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group $R_2$-$R_6$: OR, SR, NRR', R, $O^-M^+$; in which R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;

$M^+$: an alkaline metal cation or earth alkaline metal cation, or an ammonium ion.

$R_1$-$R_6$ may be joined together to form a cyclic structure of at least 5 carbon atoms Preferably a component containing at least one moiety according to formula II is added in the process:

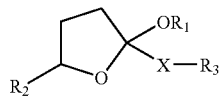

with X being $CHR_4$, or a carbonyl group (C=O)

$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group $R_2$-$R_4$: OR, SR, NRR', R, $O^-M^+$; in which R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;

$M^+$: an alkaline metal cation or earth alkaline metal cation, or an ammonium ion. $R_1$-$R_3$ may be joined together to form a cyclic structure of at least 5 carbon atoms and $R_5$.

More preferably a component containing at least one moiety according to formula III is added in the process:

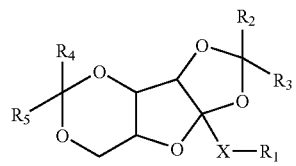

with X being $CHR_6$, or a carbonyl group (C=O)

$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group $R_2$-$R_6$: OR, SR, NRR', R, $O^-M^+$; in which R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;

$M^+$: an alkaline metal cation or earth alkaline metal cation, or an ammonium ion.

$R_1$-$R_6$ may be joined together to form a cyclic structure of at least 5 carbon atoms.

Further preferred embodiments of the component with at least one moiety according to formula I, II or III are as described above as are the preferred ranges.

The carbon-containing polymer that can be used in the process according to the present invention is preferably an oxidisable carbon-containing polymer excluding unsaturated polyesters. For use in the present invention not only homopolymers are suitable but also copolymers and blends of suitable homo- and/or copolymers can be used.

More preferably the carbon-containing polymer is a polymer that can degrade in an outdoor environment, primarily by an oxidative mechanism, to give, after complete oxo-biodegradation, mainly carbon dioxide and water. Preferred polymers are saturated polyolefins, for example very low density polyethylene, low density polyethylene, linear low density polyethylene, high density polyethylene, polypropylene and their copolymers; styrene (co) polymers and its blends with polyunsaturated polymers; unsaturated polymers such as polydiene rubber, for example cis-polyisoprene (natural or synthetic); polybutadiene; styrene-butadiene; copolymers of unsaturated polymers with saturated polymers, such as acrylonitrile-butadiene-styrene (ABS); and block co-polymers, for example styrene-butadiene-styrene (SBS); Polymers containing ester linkages for example polyethylene terephthalate, polybutylene terephthalate, polybutylene succinate terephthalate, polybutylene adipate terephthalate polylactide (co) polymers, polycaprolactone, polyhydroxyalkanoates (such as for example polyhydroxybutyrate), polyesteramides; polymers containing amide linkages for example polyamide-6, polyamide-66, polyamide-46; polymers containing ether linkages such as for example polyethyleneglycol, polypropyleneglycol, polyterahydrofuran and mixtures and block copolymers of any of the foregoing polymers. Most preferably low density polyethylene, linear low density polyethylene, high density polyethylene, polypropylene and their copolymers; styrene (co) polymers and its blends with polyunsaturated polymers are used.

In another embodiment it appeared advantageous to add in the process according to the present invention an alkaline metal salt or earth alkaline metal salt or an ammonium salt as co-catalyst. The inventors have found that the rate of oxo-biodegradability is enhanced when a co-catalyst is added to the composition. The order in which the component containing at least one moiety according to formula I, II or III and the co-catalyst are added to the carbon-containing polymer is not particularly relevant. The component containing at least one moiety according to formula I, II or III can be added first or the co-catalyst can be added first or the component containing at least one moiety according to formula I, II or III and the co-catalyst can be added at the same time, either separately or together. Suitable examples of the co-catalyst and details of its use are as described above.

The component containing at least one moiety according to formula I, II or III and/or the co-catalyst can be added to the polymer composition by methods and with apparatus generally known to the man skilled in the art of compounding of polymer compositions.

The present invention further relates to the use of the composition according to the invention or of the composition obtained by the process according to the invention for the preparation of articles with increased oxo-biodegradability. These articles are made from the composition according to the invention or from the composition obtained by the process according to the invention. These articles have an increased rate of oxo-biodegradability compared to articles made from compositions not containing an oxidation catalyst and these articles do not emit environmentally suspect metals from the oxidation catalyst to the environment as compared to other prior art materials.

The present invention also relates to the articles with increased oxo-biodegradability obtained by the use of the composition according to the invention or of the composition obtained by the method according to the invention. The artistes according to the invention can take any shape and are thus not limited to a specific shape. The shape will generally be dictated by the use of the article. Non-limiting examples of various articles are food packaging, bags (bread, shopping, compost, courier, garbage, poop scoop for pets), bottles, boxes, containers, cups, plastic drink holders and trays, films (blown, cast, shrink, thermoforming, laminated, cling), cutlery, drinking straws, agricultural films (mulch films, greenhouse films), landfill cover, medical and hygienic products (adult incontinence pads, diapers, feminine hygiene pads).

The oxidation rate can be determined with different methods. One method is the determination of the accumulation of chemical products with carbonyl groups with FTIR spectroscopy (absorption at 1713 cm$^{-1}$ minus the absorption at 1860 cm$^{-1}$) as a function of exposure time at e.g. 50° C. As criterion for the rate of oxidation of a polymer the time until an increase of the carbonyl groups absorption of 0.1 is reached can be used.

Another method to determine the oxidation rate is to determine the oxygen absorbance of a composition in a closed system filled with oxygen as a function of time at e.g. 50° C., as criterion for the rate of oxidation of a polymer the time until the polymer has absorbed 50 mmol oxygen/kg polymer can be used.

The present invention also relates to a process to increase the rate of oxygen-scavenging in a composition containing a carbon-containing polymer.

Processes to increase the oxygen-scavenging rate of a composition containing a carbon-containing polymer are well known and are especially useful in the food packaging business to make packaging materials from. It is known that oxygen can have a negative effect on the odor and taste and quality of packaged food thereby shortening the shelf life of the packaged food. The carbon-containing polymer present in the oxygen-scavenging composition reacts with oxygen, thereby reducing or eliminating the negative effect the oxygen could have on the odor and/or taste of food or beverages that are packaged in packages made out of the oxygen-scavenging composition.

A process to increase the oxygen scavenging rate is described in WO98/12250, wherein an article of manufacture is made from an oxygen scavenger and poly-(lactic acid). All described oxygen scavengers described there contain a transition metal catalyst. The catalyst can be a simple metal, salt, compound, complex or chelate. The transition metal is chosen from the first, second or third transition series of the Periodic Table, as especially suitable transition metal cobalt is mentioned.

A disadvantage of using transition metal catalysts for accelerating the oxygen uptake is that it will be unavoidable that part of the transition metal will be causing environmental pollution when the packaging material is disposed of into the environment. It is needless to say that this is not desirable. There is, thus, a need for a process to increase the oxygen scavenging rate which imposes less negative environmental effects. Therefore it is the aim of the invention to provide a process to increase the oxygen scavenging rate of compositions containing a carbon-containing polymer wherein the addition of a transition metal catalyst is not necessary for the oxygen-scavenging.

This aim is reached by providing a process for increasing the rate of oxygen-scavenging of a carbon-containing polymer, which process at least comprises the step of adding an oxidation catalyst to the carbon-containing polymer. A suitable oxidation catalyst is a component containing at least one moiety according to formula I:

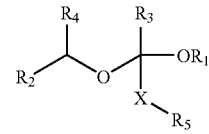

with X being $CHR_6$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_6$: OR, SR, NRR', R, O$^-$M$^+$; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;
M$^+$: an alkaline metal cation or earth alkaline metal cation, or an ammonium ion.
$R_1$-$R_6$ may be joined together to form a cyclic structure of at least 5 carbon atoms Preferably a component containing at least one moiety according to formula II is added in the process:

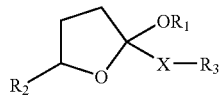

with X being $CHR_4$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_4$: OR, SR, NRR', R, $O^-M^+$; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;
$M^+$: an alkaline metal cation or earth alkaline metal cation, or an ammonium ion.
$R_1$-$R_3$ may be joined together to form a cyclic structure of at least 5 carbon atoms and $R_5$.

More preferably a component containing at least one moiety according to formula III is added in the process:

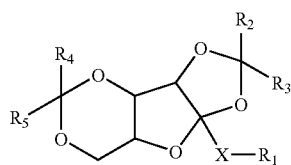

with X being $CHR_6$, or a carbonyl group (C=O)
$R_1$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group
$R_2$-$R_6$: OR, SR, NRR', R, $O^-M^+$; in which
R, R': a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group;
$M^+$: an alkaline metal cation or earth alkaline metal cation, or an ammonium ion.
$R_1$-$R_6$ may be joined together to form a cyclic structure of at least 5 carbon atoms.

Further preferred embodiments of the component with at least one moiety according to formula I, II or III are as described above as are the preferred ranges.

It has surprisingly been found that the addition of a component containing at least one moiety according to formula I, II or III is an alternative for adding a transition metal catalyst. In addition, it has been found that the addition of some of said components containing at least one moiety according to formula I, II or III even results in that the oxygen scavenging properties of the composition are more efficient than prior art catalysts such as for example cobalt.

In another embodiment it appeared advantageous to add in the process according to the present invention an alkaline metal salt or earth alkaline metal salt or an ammonium salt as co-catalyst. The inventors have found that the rate of oxygen-scavenging is enhanced when a co-catalyst is added to the composition comprising the carbon-containing polymer and the component containing at least one moiety according to formula I, II or III. The order in which the component containing at least one moiety according to formula I, II or III and the co-catalyst are added to the carbon-containing polymer is not particularly relevant. The component containing at least one moiety according to formula I, II or III can be added first or the co-catalyst can be added first or the component containing at least one moiety according to formula I, II or III and the co-catalyst can be added at the same time, either separately or together. Suitable examples of the co-catalyst and details of its use are as described above.

The component containing at least one moiety according to formula I, II or III and/or the co-catalyst can be added to the polymer composition by methods and with apparatus generally known to the man skilled in the art of compounding of polymer compositions.

In one embodiment of the invention, the oxidisable carbon containing component is a (co) polymer. Preferable oxidisable polymers are organic polymers containing allylic positions; organic polymers containing tertiary carbons; organic polymers containing benzylic positions and organic polymers containing ether segments and excluding unsaturated polyesters.

Examples of organic polymers containing allylic positions are butadiene containing (co)polymers; isoprene containing (co)polymers or cyclohexene copolymer, like for example ethylene-cyclohexene copolymers.

Examples of organic polymers containing tertiary carbons are propylene containing (co)polymers, like for example propylene homopolymer or ethylene-propylene copolymer.

Examples of organic polymers containing benzylic positions are m-xylyl-amine containing polyamides, like for example MXD6-polyamide.

Preferred oxidisable polymers are organic polymers containing ether segments or butadiene containing (co)polymers, for example polymers containing ethylene glycol, propylene glycol, tetramethylene glycol or polybutadiene based segments. Preferred organic polymers containing ether segments are copolymers comprising propylene glycol segments, preferably 1,2-propylene glycol segments or, and polymer segments. More preferably said copolymer comprising propylene glycol segments and polymer segments has been prepared by copolymerising the corresponding monomers in the presence of functionalised propylene glycol segments. To allow the monomers to attach on the propylene glycol segments these segments are functionalized with end groups that can react with reactive sites of the monomer. Examples of such functional end groups and reactive monomer sites are e.g. OH, —$NH_2$, acid, epoxy and other functional groups known in the art as reactive with polyamide monomers. Suitable propylene glycol segments are linear oligomers of propylene glycol and are of the substituted type. In IUPAC nomenclature this propylene glycol is denoted as polyoxy-1, 2-propanediyl. They consist of 2 to 5000 propylene glycol monomer units, preferably of 10 to 2500 units and in this shape and size they have been copolymerised with the monomers. In this range an even distribution of the copolymers in the polycondensate appears to be achieved. During this copolymerisation copolymers of the -ABABA-type are formed comprising polymer segments A of variable length alternated with propylene glycol segments B.

In another embodiment the propylene glycol segments are present as branches in a two, three, four or higher star branched compound the centre unit of which can be e.g. a di-, tri-, tetra or higher functional ester, amide, ether, urethane. In the process of preparation of the copolymer applied in the composition of the invention, the polymer segments then grow from the free ends of the propylene glycol segment branches. During this copolymerisation linear copolymers can be formed of the type ABA or branched copolymers having branches of the type BA.

The polymer segments in the copolymers are preferably polyamide or polyester segments, more preferably polyamide segments. Examples of suitable polyesters are polyethylene terephthalate (PET), polybutylene terephthalate (PBT), polyethylene naphtanoate (PEN), polybutylene naphtanoate (PBN). Examples of suitable polyamides (PA) are aliphatic polyamides, that may eventually be branched polyamides, such as PA6, PA4.6, PA6.6, PA 11, PA12, semi aromatic polyamides as MXD6, PA6.I/6.T, PA6.6/6.T, fully aromatic polyamides and copolymers and blends of the listed polyamides and polyesters.

Suitable PPO segments are linear oligomers of PPO and are of the substituted type. In IUPAC nomenclature this PPO is denoted as polyoxy-1,2-propanediyl. They consist of 2 to 5000 polypropylene oxide monomer units, preferably of 10 to 2500 units and in this shape and size they have been copolymerised with the monomers. In this range an even distribution of the copolymers in the polycondensate appears to be achieved. During this copolymerisation copolymers of the -ABABA-type are formed comprising polymer segments A of variable length alternated with propylene oxide segments B.

In another embodiment the substituted PPO segments are present as branches in a two, three, four or higher star branched compound the centre unit of which can be e.g. a di-, tri-, tetra or higher functional ester, amide, ether, urethane. In the process of preparation of the copolymer applied in the composition of the invention, the polymer segments then grow from the free ends of the PPO segment branches. During this copolymerisation linear copolymers can be formed of the type ABA or branched copolymers having branches of the type BA.

Apart from the PPO segments also other ether segments optionally may be present as e.g. polyethylene oxide, however in smaller amounts than the PPO. Preferably the other ether segments are present in amounts less than 40 wt %, more preferably less than 30 wt % or less than 10 wt % of the amount of PPO. Also the PPO segments themselves may comprise a minority, i.e. present in amounts less than 40 wt %, more preferably less than 30 wt % or less than 10 wt % of the amount of PPO, of other poly(alkylene)oxide units, usually as co-blocks. An example of this is a block poly(ethylene)oxide-substituted PPO block-block poly(ethylene)oxide triblock segment.

In another embodiment of the invention, the oxidisable carbon containing component is an organic component containing allylic positions, like for example ascorbic acid, isoascorbic acid, squalene, an unsaturated fatty acid, castor oil, d-limonene or dihydroanthracene The composition according to the invention preferably further contains a polycondensate. The polycondensate is preferably (co)polyamide or (co)polyester or mixtures thereof, more preferably the polycondensate is polyamide.

Further the composition according to the invention may comprise other usual additives that may give a certain additional required property to the composition, examples of which are fibres, fillers, nano-particles, antioxidants, flame retardants, mould release agents and other compounds known in the art for this purpose.

The composition containing the oxidisable carbon-containing component and the component containing at least one moiety according to formula I, II or III, can be prepared by mixing the oxidisable carbon-containing component with the component containing at least one moiety according to formula I, II or III, in a separate step or in a step in the process of manufacturing the oxygen scavenging object. This mixing can be conducted in the equipment known in the art such as extruders and mixers. The process applies melt-mixing, i.e. the mixing takes place above the melting point of the oxidisable carbon-containing component but below its decomposition temperature.

The present invention also relates to the use of a composition obtained by a process according to the invention and to the preparation of an oxygen-scavenging article. The present invention further relates to articles containing an oxygen scavenging layer containing such a composition.

The present invention further also relates to the composition with an increased rate of oxygen-scavenging obtained by the process according to the invention. It also relates to the use of the composition of the invention for the preparation of an oxygen-scavenging article, like for example a container for food, drink or feed packaging such as a film, a bottle, a vessel or a wrap. In a preferred embodiment of the present invention the composition is used for the preparation of an object having at least one surface that is to be exposed to an oxygen containing environment, wherein the object comprises a layer containing the composition according to the invention. More in particular, the present invention relates to a multilayer object containing a layer of the composition of the invention. In one embodiment, the object is a multilayer object containing a layer of the composition of the invention wherein said layer being separated from a first surface of the object by one or more first layers having an overall oxygen permeability of at most 500 cm$^3$/m$^2$.24 h.atm (when measured according to ASTM standard D3985 under dry conditions on a film having a thickness of 60 μm). In another embodiment, the composition is present in at least a layer forming a second surface of the object, opposite to the first surface, or being separated from said second surface by one or more second layers, the second layers having an overall oxygen permeability of more than 500 cm$^3$/m$^{20}$.24 h.atm (when measured according to ASTM standard D3985 under dry conditions on a film having a thickness of 60 μm). In still another embodiment of the invention, the layer containing the composition is separated from a second surface of the object opposite to the first surface, by one or more second layers, the second layers having an overall oxygen permeability of at most 500 cm$^3$/m$^2$.24 h.atm (when measured according to ASTM standard D3985 under dry conditions on a film having a thickness of 60 μm).

In specifically preferred embodiments of the invention in the description above, the compositions of the invention, either the composition with an increased rate of oxygen-uptake or the composition with increased rate of oxo-biodegradability or the composition with oxygen-scavenging properties, are essentially free of cobalt. With "essentially free of cobalt" is here and hereinafter meant that the cobalt concentration is lower than 10 ppm. More preferably the cobalt concentration is lower than 5 ppm and even more preferably lower than 1 ppm, calculated on the total weight of the composition, most preferably the composition is free of cobalt.

Preferably not only the cobalt concentration is within the limits as indicated, more preferably, the composition of the invention is essentially free of all transition metal. With "essentially free of transition metal" is meant that the transition metal concentration is lower than 10 ppm. More preferably the transition metal concentration is lower than 5 ppm and even more preferably the transition metal concentration is lower than 1 ppm, calculated on the total weight of the composition. Most preferably the composition is free of transition metal. In case several different transition metals are present in the composition, the given concentrations are meant for each individual transition metal.

To all compositions described above, either the composition with an increased rate of oxygen-uptake or the composition with increased rate of oxo-biodegradability or the composition with oxygen-scavenging properties, other components can be added. Examples of components that are suitable to be added are stabilizers to increase the processability and to adapt the life time of the oxidisable carbon containing polymer.

One class of stabilizers that can be added is the class of primary antioxidants like phenolic antioxidants and aromatic amines. Examples of these primary antioxidants are: 2,6-di-t-butyl-4-methylphenol, 2,6-di-t-butyl-4-ethyl-phenol, benzenepropanoic acid, 3,5-bis(1,1-dimethylethyl)-4-hydroxy-octadecyl ester, 2,2'-methylenebis(6-t-butyl-4-methylphenol), 2,2'-methylenebis 6-(1-methylcyclohexyl)-p-cresol, 4,4'-butylidenebis(6-t-butyl-3-methyl-phenol), bis-(2-t-butyl-4-methyl-6-(3-t-butyl-5-methyl-2-hydroxy-benzyl)-phenyl)-terephthalate, 1,1,3-Tris(2-methyl-4-hydroxy-5-t-butyl phenyl)butane, 1,3,5-Trimethyl-2,4,6-tris (3,5-di-t-butyl-4-hydroxybenzyl) benzene, butyric acid, 3,3-bis(3-t-butyl-4-hydroxyphenyl)ethylene ester, 1,3,5-tris(3', 5'-di-t-butyl-4'-hydroxybenzyl)-s-triazine-2,4,6-(1H, 3H, 5H)trione, 1,3,5-tris(4-t-butyl-2,6-dimethyl-3-hydroxy-benzyl)-iso-cyanurate, 3-(3,5-di-t-butyl-4-hydroxy-phenyl)propion acid ester with 1,3,5-tris(2-hydroxy-ethyl)-iso-cyanurate, tetrakis[methylene (3,5-di-t-butyl-4-hydroxyhydrocinnamate)]methane, N,N'-hexamethylene bis (3,5-di-t-butyl-4-hydroxyhydrocinnamamide, 3,9-bis(1,1-dimethyl-2-(β-(3-t-butyl-4-hydroxy-5-methyl-phenyl)-propyonyl-oxy)-ethyl)-2,4,8,10-tetraoxospiro, 2,2'-ethylidenebis(4,6-di-t-butylphenol), 4,4'-methylenebis(2,6-di-t-butylphenol), tri-ethylene-glycol-bis-3-(t-butyl-4-hydroxy-5-methyl-phenyl)-propionate, 1,6-hexane-diol-bis-3-(3,5-di-t-butyl-4-hydroxyphenyl)-propionate, butylated hydroxyanisole, 2,6-di-t-butyl-4-sec-butyl-phenol, [2-propyleneacid, 2-isopentane-6-[(3-isopentane-2-hydroxy-5-isopentane-phenyl)-ethyl]-4-methyl-phenyl-ester], [2-propylene-acid, 2-t-butyl-6-[(3-t-butyl-2-hydroxy-5-methyl-phenyl)-methyl]-4-methyl-phenyl-ester], p-cresol/dicyclopentadiene butylated reaction product, di-ethyl-ester of 3,5-di-t-butyl-4-hydroxy-benzyl-phosphoric acid, 2,5,7,8-tetra-methyl-2-(4',8',12'-tri-methyl-tri-decyl)-6-chromanol, N,N'-1,3-propanediylbis(3,5-di-t-butyl-4-hydroxyhydrocinnamamide, calcium bis[monoethyl(3,5-di-t-butyl-4-hydroxybenzyl)phosphonate, 4,4'-di-cumyl-di-phenyl-amine and 2,2,4-trimethyl-1,2-dihydroquinoline polymer.

Another class of stabilizers that can be added is the class of the secondary antioxidants like the phosphites and the thioethers. Examples of these secondary antioxidants are: trisnonylphenyl phosphite, tris(2,4-di-t-butylphenyl)phosphite, 2,2-methylene-bis-(4,6-di-t-butyl-phenyl)-octyl-phosphite, 2,2'-ethylidenebis (4,6-di-t-butylphenyl)fluorophosphonite, bis-(2,4-di-tert-butyl-6-methylphenyl)ethyl phosphite, 2,4,6 tri-t-butylphenyl-2-butyl-2-ethyl-1,3-propane-diol-phosphite, distearyl pentaerythritol diphosphite, tetrakis-(2,4-di-tert-butyl-phenyl)-4,4'-bi-phenylene-di-phosphonite, bis-(2, 4-di-t-butylphenyl)pentaerythritol diphosphite, bis-(2,6-di-tbutyl-4-methyl-phenyl)-pentaerytritol-di-phosphite, bis-(2,4-dicumylphenyl)-pentaerytritol-diphosphite, 1,3-bis-(diphenylphosphino)-2,2-dimethyl-propane, 2,2',2"-nitrilo triethyl-tris[3,3',5,5'-tetratert-butyl-1,1'-biphenyl-2,2'-diyl] phosphite, dilauryl thiodipropionate, di-myristyl thiodipropionate, distearyl thiodipropionate, distearyl disulfide and pentaerythrityl tetrakis(β-laurylthiopropionate).

To regulate the life time in outdoor conditions, UV stabilizers like UV absorbers and Hindered Amine stabilizers (HALS) can be added to the oxidisable carbon-containing polymer. Examples of the UV-absorbers are hydroxy-benzophenones like 2-hydroxy-4-n-octoxybenzophenone, 2-hydroxy-4-n-dodecyloxy-benzophenone; hydroxy-benzotriazoles like: 2-(2'-hydroxy-3'-t-butyl-5'-methylphenyl)-5-chlorobenzotriazole, 2-(2-hydroxy-5-t-octylphenyl) benzotriazole, bis[2-hydroxy-5-t-octyl-3-(benzotriazol-2-yl) phenyl]methane, 2-[2-Hydroxy-3,5-di(1,1-dimethylbenzyl) phenyl]-2H-benzotriazole and other types like the oxalanilides, hydroxybenzoates, diphenylacrylates and hydroxytriazines. Examples of the HALS stabilizers are: alkylsubstituted piperidyl-, piperidinyl- or piperazinone containing compounds such as for example 2,2,6,6-tetramethyl-4-piperidone, 2,2,6,6-tetramethyl-4-piperidinol, bis-(1,2,2,6, 6-pentamethylpiperidyl)-(3',5'-di-tert-butyl-4'-hydroxybenzyl)-butylmalonate, di-(2,2,6,6-tetramethyl-4-piperidyl)-sebacate, dimethyl succinate polymer with 4-hydroxy-2,2,6,6-tetramethyl-1-piperidine ethanol, poly [[6-[(1,1,3,3-tetramethylbutyl)amino]-s-triazine-2,4-diyl][2, 2,6,6-tetramethyl-4-piperidinyl)imino]hexamethylene[(2,2, 6,6-tetramethyl-4-piperidinyl)imino]], bis-(2,2,6,6-tetramethyl-4-piperidinyl)-succinate, bis-(1-octyloxy-2,2,6, 6-tetramethyl-4-piperidinyl)-sebacate, bis-(1,2,2,6,6-pentamethyl-4-piperidinyl)-sebacate, tetrakis-(2,2,6,6-tetramethyl-4-piperidyl)-1,2,3,4-butaan-tetracarboxylate, N,N'-bis-(2,2,6,6-tetramethyl-4-piperidyl)-hexane-1,6-diamine, N-butyl-2,2,6,6-tetramethyl-4-piperidinamine, 2,2'-[(2,2,6,6-tetramethyl-piperidinyl)-imino]-bis-[ethanol], poly ((6-morpholine-5-triazine-2,4-diyl)(2,2,6,6-tetramethyl-4-piperidinyl)-iminohexamethylene-(2,2,6,6-tetramethyl-4-piperidinyl)-imino), 5-(2,2,6,6-tetramethyl-4-piperidinyl)-2-cyclo-undecyl-oxazole) 1,1'-(1,2-ethaan-di-yl)-bis-(3,3',5, 5'-tetramethyl-piperazinone), -8-acetyl-3-dodecyl-7,7,9,9-tetramethyl-1,3,8-triazaspiro(4,5)decaan-2,4-dion, polymethylpropyl-3-oxy-[4(2,2,6,6-tetramethyl)-piperidinyl)-siloxane, 1,2,3,4-butane-tetracarboxylzuur-1,2,3-tris(1, 2,2,6,6-pentamethyl-4-piperidinyl)-4-tridecylester, copolymer of alfa-methylstyreen-N-(2,2,6,6-tetramethyl-4-piperidinyl)maleimide and N-stearyl-maleimide, N-2,2,6,6-tetramethyl-4-piperidinyl-N-amino-oxamide, 4-acryloyloxy-1,2,2,6,6-pentamethyl-4-piperidine, mixtures of esters of 2,2,6,6-tetramethyl-4-piperidinol and fatty acids, 1,5,8,12-tetrakis[2',4'-bis(1",2",2",6",6"-pentamethyl-4"-piperidinyl(butyl)amino)-1',3', 5'-triazin-6'-yl]-1,5,8,12-tetraazadodecane.

The composition according to the invention might further contain: fillers, other degradable components, photo-initiators and pigments. Preferably all these components have a particle size of less than 150 mesh. Fillers may be selected from the inorganic carbonates, synthetic carbonates, talc, magnesium hydroxide, aluminium trihydrate, diatomaceous earth, mica, natural or synthetic silicas and calcinated clays or mixtures thereof. An example of a photoinitiator is benzophenone. Examples of other degradable components are starch or poly-(lactic acid), poly (caprolactone), poly-(hydroxybutyrate and/or valerate), poly-(ethylenadipate). Examples of pigments are carbon black and titanium dioxide.

The invention is now demonstrated by means of a series of examples and comparative examples. All examples are supportive of the scope of claims. The invention, however, is not restricted to the specific embodiments as shown in the examples.

EXPERIMENTAL PART

Preparation of the Catalyst

Potassium octanoate was bought from CHEMOS GmbH. 2,3:4,6-Di-O-isopropylidene-2-keto-L-gulonic acid (DAG) was bought from Aldrich.

Synthesis of di-O-Isopropylidene-Sorbose (Diacetonesorbose, DAS)

To 25 g sorbose, finely pulverized and mixed in suspension in dried, distilled acetone, was added 14 ml 85.6% $H_2SO_4$ gradually over 20 min. at 20-25° C., the mixture was cooled to 0.2° C., 7 ml. 98% $H_2SO_4$ was added and the mixture agitated at 5° C. for a while. The solution was filtered to remove unreacted sorbose. The filtrate was neutralized with 12% aq. $Na_2CO_3$ at 5-10° C. with agitation for 2 hrs. The slightly alkaline mixture was filtered and acetone was removed by vacuum distillation. Di-O-isopropylidene-sorbose was extracted with 250 ml ether in 50 ml portions, the ether was being removed by distillation and finally by entrainment with nitrogen.

Synthesis of Potassium salt of 2,3:4,6-di-O-isopropylidene-2-keto-L-gulonic acid (K-DAG)

To a methanolic solution of DAG (600 gram in 1 liter) a solution of $K_2CO_3$ in water (150 gram in 400 ml) was added drop wise. After evaporation of the solvent, the formed powder was dried in a vacuum oven at room temperature (23° C.).

Preparation of Solvent Blended Compounds

DAG, DAS and potassium octanoate were added to a polypropylene powder (iso-tactic PP with an solution viscosity in decalin at 135° C. of 1.58 dg/ml) by solvent blending (adding the catalysts as a solution followed by evaporation of the solvent).

Examples I-IX and Comparative Experiments A-C

Determination of the Effectivity of the Catalysts

The effectivity of the catalysts on the oxygen uptake rate of the PP compounds was determined. In a vessel of 65 ml, to which a pressure transducer was connected, 1 gram polymer powder was brought into contact with an atmosphere containing 100% oxygen. The drop of the pressure in the vessel at 50° C. was recorded. From the drop in pressure, the oxygen uptake was calculated.

As a measure of the activity of the catalysts, the time (hrs) to an oxygen uptake of 50 mmol/kg was determined. The results are shown in Table 1.

TABLE 1

| Example | Catalyst. | Amount (wt %) | Co-catalyst | Amount (wt %) | Time (hrs) |
|---|---|---|---|---|---|
| I | DAG | 1.0 | Potassium octanoate | 0.25 | 160 |
| II | DAG | 1.0 | Potassium octanoate | — | 240 |
| III | DAG | 1.0 | Potassium octanoate | 0.76 | 100 |
| IV | DAG | 1.0 | Potassium octanoate | 1.3 | 115 |
| V | DAG | 1.0 | Potassium octanoate | 2.5 | 160 |
| VI | DAG | 1.0 | Potassium octanoate | 0.06 | 225 |
| VII | DAG | 1.0 | Potassium octanoate | 0.18 | 175 |
| VIII | DAG | 1.0 | Potassium octanoate | 0.37 | 150 |
| IX | DAG | 0.5 | Potassium octanoate | 0.76 | 230 |
| A | — | — | — | — | >500 |
| B | Cobalt-acetate | 0.1 | | | >120 |
| C | | | Potassium octanoate | | >500 |

The examples and comparative experiments clearly demonstrate the oxygen uptake capacity of compositions according to the invention. Furthermore they clearly demonstrate the enhanced efficiency which can be obtained by adding a cocatalyst according to the invention. In addition, it is shown that the use of certain containing components even results in that the oxygen scavenging properties of the composition are more efficient, i.e. the rate of oxygen-uptake is higher, compared to the use of a cobalt compound as oxidation catalyst.

Examples X-XXV and Comparative Experiments D-E

Preparation of Oxygen Scavenging Films

Different catalysts were melt-mixed with polypropylene (iso-tactic PP with an solution viscosity in decalin at 135° C. of 1.58 dg/ml). The mixing was carried out at a barrel temperature of 190° C., a rotation speed of 120 rpm and a residence time of 3 minutes. All experiments were carried out under nitrogen atmosphere. Information regarding these samples is given in Table 2.

All samples were ground under cryogenic conditions. The resulting powders were pressed between flat hot plates into films with a thickness of about 200 micrometer. Pressing conditions were: plates temperature: 190° C., time between plates without pressure: 0.5 min, subsequently pressurizing the system for 2 minutes at 150 kN.

These films were placed in an air venting oven (Binder FDL115) at 50° C. With FT-IR spectroscopy (Perkin Elmer Spectrum One) the increase of the carbonyl absorbance (Absorbance at 1713 $cm^{-1}$ minus the absorption at 1860 $cm^{-1}$) was measured as a function of oven residence time. As degradation criterion the time until an increase of this carbonyl absorption of 0.1 was reached is mentioned in Table 2.

TABLE 2

| Examples | Catalyst | Amount (wt %) | Co-catalyst | Amount (wt %) | Time (hrs) |
|---|---|---|---|---|---|
| D | — | — | — | — | >1500 |
| E | — | — | Potassium octanoate | 0.76 | >1500 |
| X | DAG | 1.0 | Potassium octanoate | — | |
| XI | DAG | 1.0 | Potassium octanoate | 0.37 | |
| XII | DAG | 1.0 | Potassium octanoate | 0.76 | 300 |
| XIII | DAG | 1.0 | Potassium octanoate | 1.3 | 400 |
| XIV | DAG | 1.0 | Potassium octanoate | 2.5 | 850 |
| XV | DAG | 0.5 | Potassium octanoate | 0.34 | 650 |
| XVI | DAG | 0.25 | Potassium octanoate | 0.17 | 1500 |
| XVII | KDAG | 1.0 | | | 1100 |
| XVIII | DAS | 1.1 | Potassium octanoate | — | 1000 |
| XIX | DAS | 1.3 | Potassium octanoate | 0.8 | 550 |
| XX | DAS | 1.2 | Potassium octanoate | 1.4 | 550 |
| XXI | DAS | 1.1 | Potassium octanoate | 2.8 | 450 |
| XXII | DAS | 0.5 | Potassium octanoate | 0.7 | 900 |
| XXIII | DAS | 0.5 | Potassium octanoate | 0.4 | 900 |
| XXIV | DAS | 0.7 | Potassium octanoate | 0.3 | 800 |
| XXV | DAS | 1.5 | Potassium octanoate | 0.8 | 500 |

The invention claimed is:
1. A composition comprising:
(A) a component containing at least one moiety according to formula III:

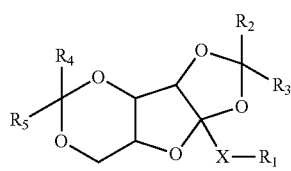

formula III wherein,

X is $CHR_6$ or a carbonyl group (C=O), $R_1$ is a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group, and $R_2$-$R_6$ are groups independently selected from OR, SR, NRR', R, and O-M+; wherein R and R' is each a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group; and wherein M+ is an alkaline metal cation, an earth alkaline metal cation, or an ammonium ion, and (B) a carbon-containing polymer, wherein the carbon-containing polymer is a saturated polyester, saturated polyether and/or saturated hydrocarbon polymer; and wherein the carbon-containing polymer is a homopolymer, co-polymer or a blend of homo and/or copolymers.

2. The composition according to claim 1, which further comprises an alkaline metal salt, an alkaline earth metal salt or an ammonium salt.

3. An article comprised of a composition according to claim 1.

4. A composition comprising a carbon-containing polymer and at least one component selected from the group consisting of O-isopropylidene-2-keto-L-gulonic acid (DAS), 2,3:4,6-di-O-isopropylidene-2-keto-L-gulonic acid (DAG) and salts thereof, wherein the carbon-containing polymer is a saturated polyester, saturated polyether and or saturated hydrocarbon polymer; and wherein the carbon-containing polymer is a homopolymer, co-polymer or a blend of homo and/or copolymers.

5. A composition as in claim 4, wherein the component is a potassium salt of 2,3:4,6-di-O-isopropylidene-2-keto-L-gulonic acid (KDAG).

6. A composition as in claim 4, further comprising potassium octanoate.

7. A composition as in claim 4, wherein $R_1$-$R_6$ are joined together to form a cyclic structure of at least 5 carbon atoms.

8. An article comprised of a composition according to claim 4, 5, 6 or 7.

* * * * *